(12) United States Patent
Ward et al.

(10) Patent No.: US 7,953,896 B2
(45) Date of Patent: May 31, 2011

(54) MANAGING USER ACCOUNTS AND GROUPS IN MULTIPLE FORESTS

(75) Inventors: Robert D. Ward, Redmond, WA (US);
Nima Ganjeh, Bellevue, WA (US);
Andreas B. G. Kjellman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 198 days.

(21) Appl. No.: 12/473,113

(22) Filed: May 27, 2009

(65) Prior Publication Data

US 2010/0306376 A1    Dec. 2, 2010

(51) Int. Cl.
*G06F 15/16* (2006.01)
(52) U.S. Cl. ......... 709/252; 709/221; 709/226; 709/249
(58) Field of Classification Search .................. 709/221, 709/226, 249, 252
See application file for complete search history.

(56) References Cited

U.S. PATENT DOCUMENTS

| | | | |
|---|---|---|---|
| 5,220,604 A * | 6/1993 | Gasser et al. ......................... 1/1 |
| 7,197,565 B2 * | 3/2007 | Abdelaziz et al. ............ 709/226 |
| 7,200,869 B1 | 4/2007 | Hacherl et al. |
| 7,203,753 B2 * | 4/2007 | Yeager et al. ................. 709/225 |
| 7,206,934 B2 * | 4/2007 | Pabla et al. ................... 713/168 |
| 7,398,308 B2 | 7/2008 | Friedel et al. |
| 7,603,555 B2 * | 10/2009 | Schmidt et al. ............... 713/168 |
| 7,613,703 B2 * | 11/2009 | Kakivaya et al. ..................... 1/1 |
| 7,774,446 B2 * | 8/2010 | Nedelcu et al. ............... 709/223 |
| 2003/0236979 A1 * | 12/2003 | Himmel et al. ............... 713/167 |
| 2004/0162786 A1 | 8/2004 | Cross et al. |
| 2008/0109870 A1 | 5/2008 | Sherlock et al. |

OTHER PUBLICATIONS

"Virtual Identity Server for Identity Lifecycle Manager (VIS for ILM)", Retrieved at <<http://www.optimalidm.com/products/vis/VISforILM.aspx>>, Optimal IdM, L.L.C., Apr. 1, 2009, pp. 1-2.
"Extending ActiveRoles Server Management to Exchange Resource Forests ActiveRoles Exchange Resource Forest Manager", Retrieved at <<http://www.quest.com/activeroles-server/exchresourceforestmgr.aspx>>, Quest Software Inc., Apr. 1, 2009, pp. 1-2.
"Identity Lifecycle Manager "2" Overview", Retrieved at <<http://technet.microsoft.com/en-us/library/dd239150.aspx>>, Microsoft Corporation, Oct. 27, 2008, pp. 1-7.
"EmpowerID Role Enforcer for Groups", Retrieved at <<http://www.thedotnetfactory.com/role_enforcer_groups.php>>, The Dot Net Factory, Apr. 1, 2009, p. 1.
"Solaris Active Directory Integration", Retrieved at <<http://www.likewise.com/products/likewise_enterprise/solaris-active-directory-integration.php>>, Likewise Software, Apr. 1, 2009, pp. 1-4.

* cited by examiner

*Primary Examiner* — Michael Won

(57) ABSTRACT

Methods, systems, and computer program products are provided for managing contact proxies and security proxies in networks that are organized as forests. For instance, contact proxies may be generated to represent user accounts and groups in forests other than the home forests of the user accounts and groups. Security proxy objects may be generated to represent group members (e.g., security principals and groups) in groups in forests other than the home forests of the group members. Furthermore, when both a contact object and a security proxy object exist for a member added to a group, one of the contact object or the security proxy object may be selected to represent the member in the group.

14 Claims, 12 Drawing Sheets

MANAGING USER ACCOUNTS AND GROUPS IN MULTIPLE FORESTS

BACKGROUND

Various services exist for managing computer networks. Such services may be configured to manage users and groups, and resources of the network that may be accessed by the users and groups. For example, Active Directory®, published by Microsoft Corporation of Redmond, Wash., is a directory service used to store information about the entities contained in a network. Active Directory® maintains a network structure as a hierarchical framework of objects. Several categories of objects exist in such a structure, including resources (e.g., printers, computers, etc.), services (e.g., email), and user-related objects such as user accounts and groups. The network structure provides various functions, including providing information on the objects, organizing the objects, controlling access, and setting security.

A computer network may be managed by such a service at various levels. For example, in one configuration, a highest level may be referred to as a "forest." A forest includes all objects of a particular network, including all users and groups of the network. A forest may include one or more domains. Each domain may include a portion of the objects included in the forest. Further levels may be present in networks, such as "trees" (a level between forest and domain) and/or further types of levels.

Multiple computer networks may exist that each are managed as a separate forest. It may be desirable for multiple separate forests to be able to share objects, such as user accounts and groups. For example, a business entity may maintain two networks implemented as first and second forests. The business entity may desire for users in the first forest to be able to access resources in the second forest, and for users in the second forest to be able to access resources in the first forest. Furthermore, it may be desirable for user accounts in the first forest to be members of groups in the second forest, and vice versa. In current implementations, to be a member of a group in a second forest, a user account of the first forest is provided with a representation in the second forest. For example, the user account may have a security proxy in the second forest that enables the user to be a member of a security group, or may have a contact proxy in the second forest to enable the user to be included in a mail group. However, rules for determining when security proxies and contact proxies are generated, and for managing such proxies, are complex.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for managing contact proxies and security proxies in networks that are organized as forests. For instance, contact proxies may be generated to represent user accounts and groups in forests other than the home forests of the user accounts and groups. Security proxy objects may be generated to represent group members (e.g., security principals, such as user accounts and computer objects, and groups) in groups in forests other than the home forests of the group members. Furthermore, when both a contact object and a security proxy object exist for a member that is added to a group, one of the contact object or the security proxy object is selected to represent the member in the group.

In one implementation, a method for generating contact objects is provided. An indication is received that an object is mail-enabled. The mail-enabled object is included in a first forest. One or more forests are determined that is/are associated with the first forest. The mail-enabled object is included in a contact set associated with each determined forest. A contact object is generated for the mail-enabled object. The contact object is included in a domain of each forest of the plurality of forests.

In another implementation, a method for generating security proxy objects is provided. An indication of a member added to a group is received. The group is in a domain that is in a first forest. Whether the group is a cross-forest security group is determined. Whether a home forest of the added member is a forest that is trusted by the first forest is also determined. The added member is included in a security proxy set associated with the domain if the group is determined to be a cross-forest security group and the home forest of the added member is determined to be a trusted forest of the first forest. A security proxy object for the added member is generated. The security proxy object is included in the domain and in the group.

In another implementation, a contact object or security proxy object is selected to represent a member in a group. An indication of a member added to a group is received. The group is in a domain that is in a first forest. Whether the added member is associated with a previously generated security proxy object and a previously generated contact object is determined. If the added member is determined to be associated with a previously generated contact object and security proxy object, whether the group is a cross-forest security group is determined and whether a home forest of the added member is a forest that is trusted by the first forest are determined. The security proxy object is included as a member of the group if the group is determined to be a cross-forest security group and the home forest of the added member is determined to be trusted by the first forest. The contact object is included as a member of the group if the group is determined to not be a cross-forest security group.

Furthermore, multi-forest managers are also provided for generating contact objects, for generating security proxy objects, and for selecting contact objects or security proxy objects to represent members in groups.

Still further, computer program products are also described herein for generating contact objects, for generating security proxy objects, and for selecting contact objects or security proxy objects to represent members in groups, and for further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
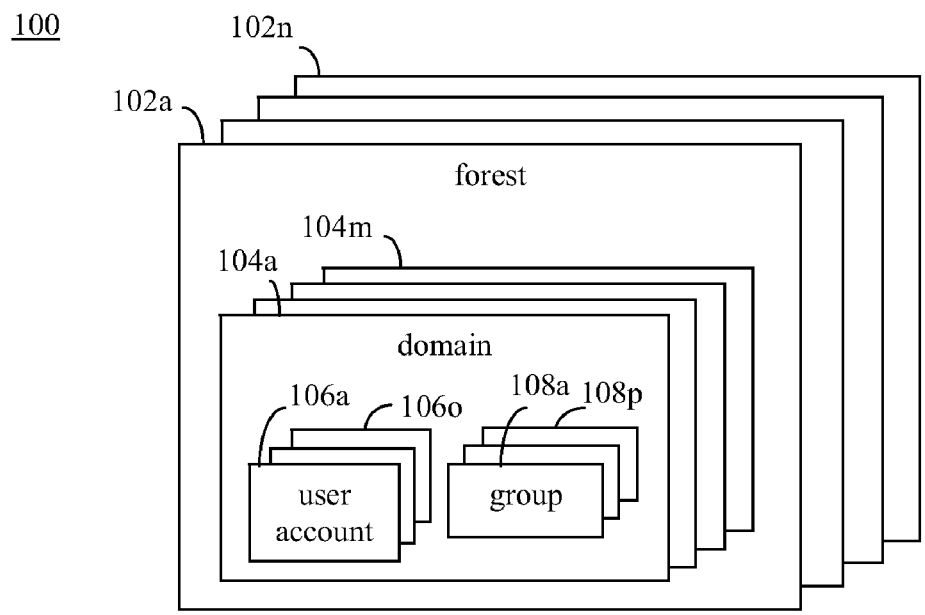
FIG. 1 shows a block diagram of a plurality of forests.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Example Embodiments

Embodiments relate to the management of security principals and groups in computer networks. Entities included in a computer network may be managed at various levels. For example, in one configuration, a highest level of management of entities of a network may be referred to as a "forest." A forest includes all objects of a particular network, including all user accounts and groups of the network. A forest may include one or more domains. Each domain includes a portion of the objects included in the forest.

Figure 2:
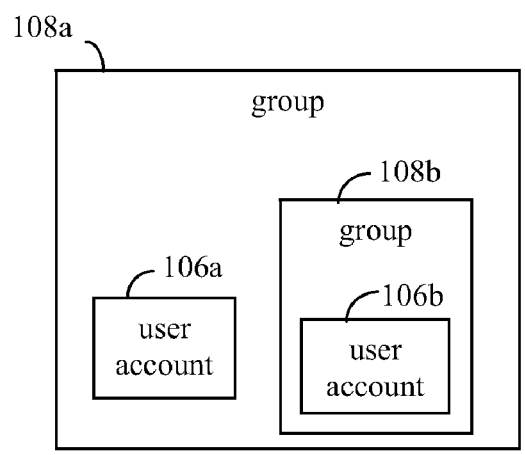
FIG. 2 shows a block diagram of an example group.

For instance, FIG. 1 shows a block diagram of a plurality of forests 102a-102n. Any number of forests 102 may be present in embodiments to cover corresponding networks. As shown in FIG. 1, forest 102a includes a plurality of domains 104a-104m. Each forest 102 may included any number of domains 104. As shown in FIG. 1, domain 104a includes a plurality of user accounts 106a-106o and a plurality of groups 108a-108p. Any number of user accounts 106 and/or groups 108 may be included in each domain 104. A group 108 may include one or more user accounts 106 and/or one or more further groups 108. For instance, FIG. 2 shows a block diagram of an example group 108a. In FIG. 2, group 108a includes user account 106a and group 108b, and group 108b includes user account 106b. Any number of user accounts 106 and/or groups 108 may be included in a group 108. It is noted that further levels may be present in networks that are not shown in FIGS. 1 and 2, such as "trees" (a level between forest and domain) and/or further types of levels.

Forests 102a-102n may be maintained by a common entity (e.g., a business, a governmental entity, etc.). The entity may desire for user accounts 106 of one or more of forests 102a-102n to be able to access resources in others of forests 102a-102n, and for user accounts 106 and groups 108 of one or more of forests 102a-102n to be members of groups 108 in others of forests 102a-102n. To enable a user account in a first forest to have access to resources in a second forest, the user account may be provided with a contact object representation in the second forest. To enable a user account or a group of the first forest to be member of another group in a second forest, the user account or group may be provided with a security proxy object.

Figure 3:
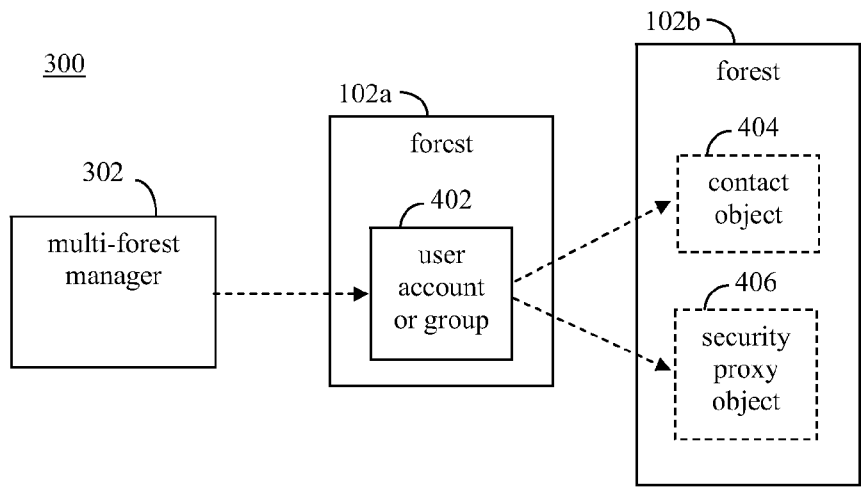
FIGS. 3 and 4 show block diagrams of example multi-forest management systems, according to example embodiments.

For instance, FIG. 3 shows a block diagram of a multi-forest management system 300, according to an example embodiment. As show in FIG. 3, multi-forest management system 300 includes a multi-forest manager 302. In the example of FIG. 3, multi-forest manager 302 manages user accounts and groups across forest boundaries, including between first forest 102a and second forest 102b (further forests 102 may additionally be present that are managed by multi-forest manager 302). As shown in FIG. 3, a user account or group 402 may be added to or modified in forest 102a. For example, user account or group 402 may be a new user account or a new group formed in forest 102a. Alternatively, user account or group 402 may be a user account or a group in forest 102a that is modified to have mail privileges. As such, forest 102a is considered the "home" forest for user account or group 402. It may be desired for user account or group 402 to be accessible in second forest 102b (which may be referred to as a "remote" forest). As such, in an embodiment, multi-forest manager 302 may be configured to generate a contact object 404 and/or a security proxy object 406 to represent user account or group 402 in forest 102b. For example, multi-forest manger 302 may be configured to generate contact object 404 if user account or group 402 becomes mail-enabled. Furthermore, multi-forest manager 302 may be configured to generate security proxy object 406 if user account or group 402 FSPs is added to group.

Contact object 404 is a mail proxy for user account or group 402. Contact object 404 enables user account or group 402 of forest 102a to have mail access in forest 102b. If user account or group 402 is a user account, the user account is provided with mail (e.g., electronic mail—E-mail) access in forest 102b by the presence of contact object 404. If user account or group 402 is a group, the group is provided with mail access in forest 102b by the presence of contact object 404. In an embodiment, contact object 404 may be a data structure that identifies itself as a contact object (e.g., includes an identifying code), indicates the particular represented user account or group (e.g., stores an identification number for the user account or group), and may include an indication of the home forest of the user account or group (e.g., forest 102a in the example of FIG. 3).

Security proxy object 406 is a security proxy for user account or group 402. Security proxy object 406 enables user account or group 402 to be included in a group in forest 102b. If user account or group 402 is a user account, the user account is included in the group in forest 102b. If user account or group 402 is a group—e.g., a first group—the first group may included in another group—e.g., a second group—in forest 102b. In an embodiment, security proxy object 406 may be a data structure that identifies itself as a security proxy object (e.g., includes an identifying code), indicates the particular represented user account or group (e.g., stores an identification number for the user account or group), and may include an indication of the home forest of the user account or group (e.g., forest 102a in the example of FIG. 3). Security proxy object 406 may also be referred to as a foreign security principle (FSP) or by other security proxy name. Note that security proxy object 406 may be a security proxy for further types of security principals in addition to users, including computer objects.

Figure 4:
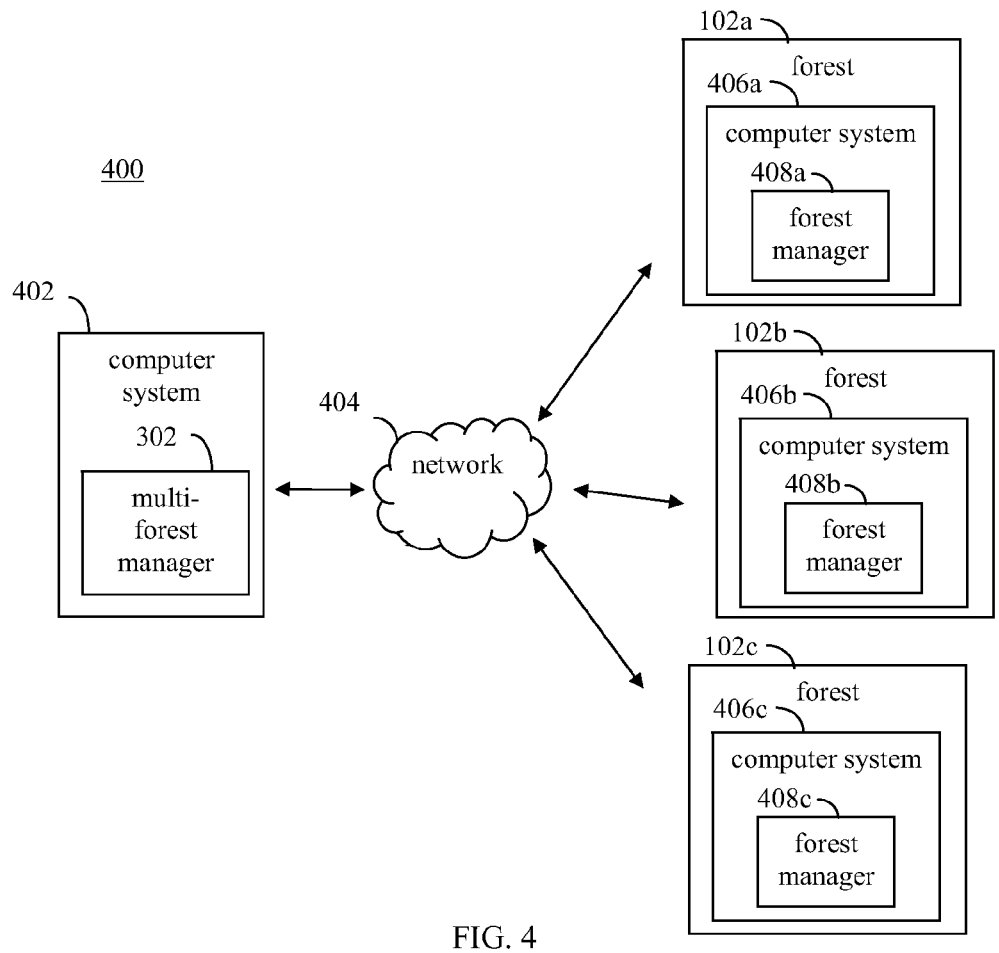

Multi-forest management system 300 may be configured in various ways to enable communications between multi-forest manager 302 and forests 102. For example, FIG. 4 shows a block diagram of a multi-forest management system 400, according to an embodiment. Multi-forest management system 400 is an example of multi-forest management system 300 shown in FIG. 3. As shown in FIG. 4, system 400 includes first computer system 402, a network 404, and first-third forests 102a-102c. Although three forests 102 are shown in FIG. 4 (for purposes of illustration), any number of forests 102 may be present in embodiments. As shown in FIG. 4, forest 102a includes a computer system 406a, forest 102b includes a computer system 406b, and forest 102c includes a computer system 406c. Furthermore, computer system 406a includes a forest manager 408a, computer system 406b includes a forest manager 408b, and computer system 406c includes a forest manager 408c. System 400 is described as follows.

Computer system 402 and computer systems 406a-406c may each be any suitable type of computing device described herein or otherwise known, including a desktop computer, a mobile computer or computing device, or other type of computer. Network 404 is configured to communicatively couple computer system 402 and computer systems 406a-406c. Network 404 may include one or more communication links and/or communication networks, wired and/or wireless, such as a PAN (personal area network), a LAN (local area network), a WAN (wide area network), or a combination of networks, such as the Internet, and may include one or more telecommunications networks, wired or wireless, such as a GSM (Global System for Mobile communications) network, a 3G network, and/or further networks.

Forest managers 408a-408c each manage a corresponding one of forests 102a-102c. For example, forest managers 408a-408c may each implement Microsoft® Active Directory® or other commercially available or proprietary service for managing computer networks. For example, a forest manager 408 may track domains 104, groups 108, and user accounts 106 included in the respective forest 102. In the embodiment of FIG. 4, each of forest managers 408a-408c may be executed by a corresponding one of computer systems 406a-406c, and multi-forest manager 302 may be executed by computer system 402. Multi-forest manager 302 may communicate with forest managers 408a-408c via communication signals transmitted between computer system 402 and computer systems 406a-406c through network 404.

Multi-forest manager 302 and forest managers 408a-408c may be implemented in hardware, software, firmware, or any combination thereof. For example, multi-forest manager 302 and/or forest managers 408a-408c may be implemented as computer program code configured to be executed in one or more processors. Alternatively, multi-forest manager 302 and/or forest managers 408a-408c may be implemented as hardware logic/electrical circuitry.

As described above, multi-forest manager 302 is configured to generate and manage contact objects and security proxy objects for user accounts and groups. Example embodiments for generating and managing contact objects and security proxy objects are described in the following subsections.

A. Example Embodiments for Generating Contacts

Figure 5:
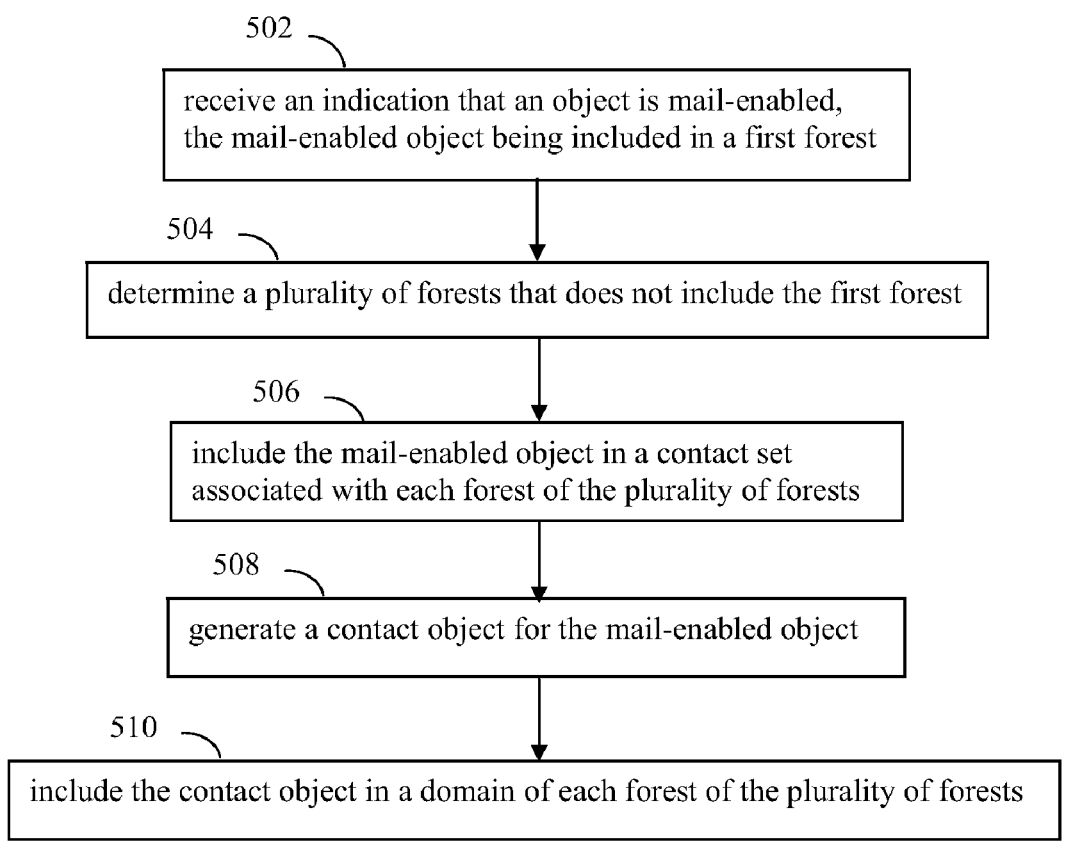
FIG. 5 shows a flowchart providing a process for generating contacts for user accounts and groups, according to an example embodiment.
Figure 6:
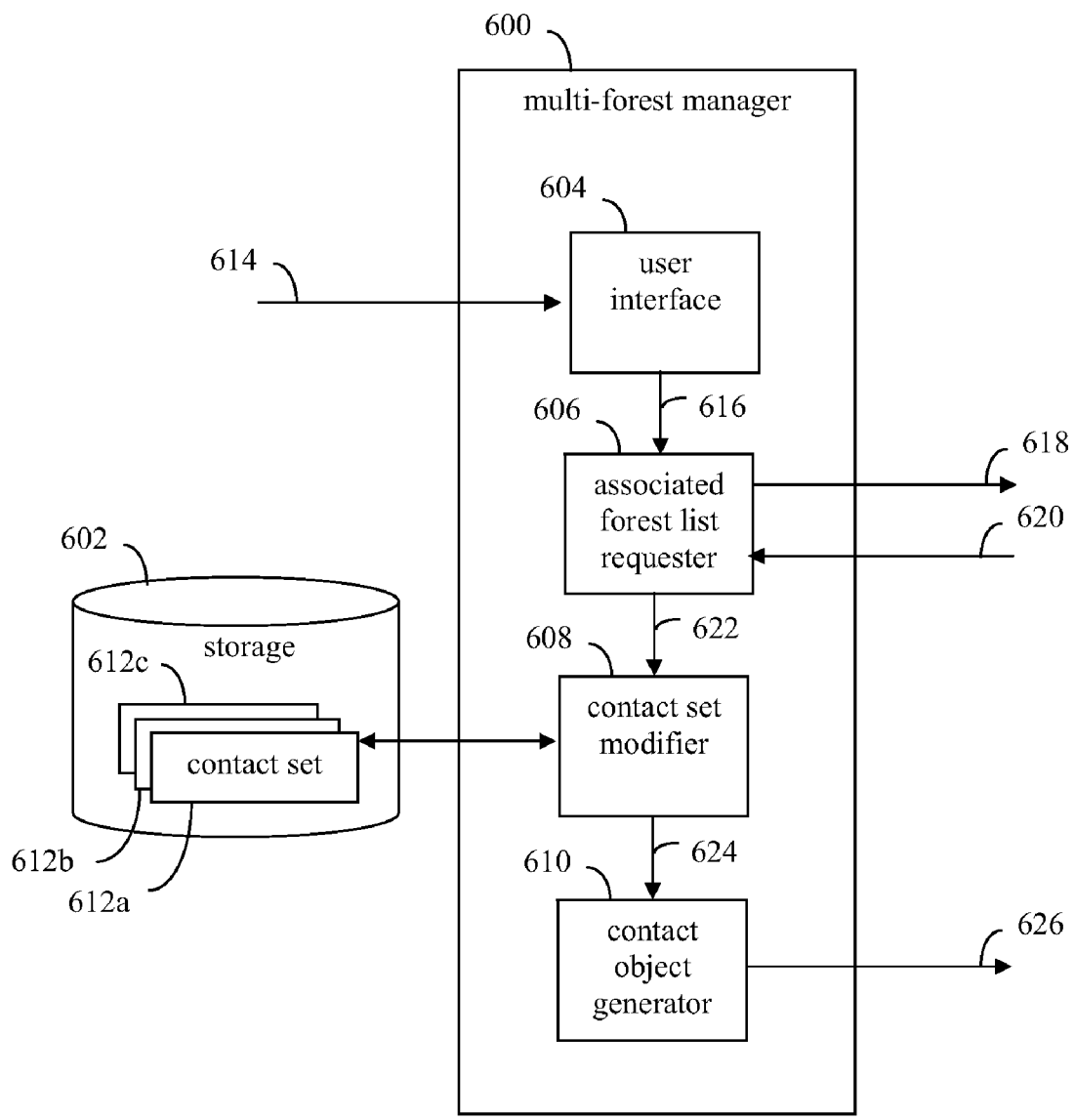
FIG. 6 shows a block diagram of a multi-forest manager, according to an example embodiment.

Contacts may be generated for user accounts and groups in various ways. For example, FIG. 5 shows a flowchart 500 providing a process for generating contacts for user accounts and groups, according to an example embodiment. In an embodiment, flowchart 500 may be performed by multi-forest manager 302 shown in FIGS. 3 and 4. Multi-forest manager 302 may be configured in various ways to generate contacts for user accounts and groups. For instance, FIG. 6 shows a block diagram of a multi-forest manager 600, according to an example embodiment. Multi-forest manager 600 is an example of multi-forest manager 302. As shown in FIG. 6, multi-forest manager 600 includes a user interface 604, an associated forest list requester 606, a contact set modifier 608, and a contact object generator 610. Flowchart 500 is described as follows with respect to multi-forest manager 600 for illustrative purposes. Other structural and operational embodiments will be apparent to persons skilled in the relevant art(s) based on the discussion regarding flowchart 500 and multi-forest manager 600.

As shown in FIG. 5, flowchart 500 begins with step 502. In step 502, an indication is received that an object is mail-enabled, the mail-enabled object being included in a first forest. For example, as shown in FIG. 6, a mail-enabled object indication 614 may be received by user interface 604. User interface 604 is an interface for users to interact with multi-forest manager 600. A user (e.g., an IT administrator or other person) may interact with user interface 604 to add a new user account or group (as the object) that is mail-enabled to a forest managed by multi-forest manager 600. The user may input information identifying the user account or group into user interface 604, including the identification of a home forest (e.g., one of forests 102a-102n in FIG. 1) for the user account or group in which the user or group is included/based. Alternatively, the user may interact with user interface 604 to mail-enable an existing user account or group of a forest managed by multi-forest manager 600. As shown in FIG. 6, user interface 604 generates a mail-enabled object information 616. Mail-enabled object information 616 identifies the object (e.g., user account or group) that is mail enabled and the home forest of the object.

User interface 604 may include any number and combination of user interface elements, such as a keyboard, a thumb wheel, a mouse pointer, a roller ball, a stick pointer, a display, any number of virtual interface elements, a voice recognition system, and/or other user interface elements described elsewhere herein or otherwise known.

User interface 604 is optional. In another embodiment, where user interface 604 is not present, mail-enabled object indication 614 may be received at associated forest list requester 606. For example, mail-enabled object indication 614 may be transmitted from a forest (e.g., from a forest manager 408 in FIG. 4 of a forest 102) where a user account or group was added and/or mail-enabled.

In step 504, a plurality of forests that does not include the first forest is determined. For example, in an embodiment, associated forest list requester 606 may be configured to determine one or more forests associated with (e.g., known by, enabled to share contacts with, etc.) the home forest of the mail-enabled object indicated in step 502. As shown in FIG. 6, associated forest list requester 606 receives mail-enabled object information 616, which identifies the home forest of the mail-enabled object. In an embodiment, as shown in FIG. 6, associated forest list requester 606 may transmit an associated forest request signal 618 to the home forest (e.g., to the forest manager 408 shown in FIG. 4, through network 404) of the mail-enabled object. Associated forest request signal 618 is a request for the home forest of the mail-enabled object to indicate to associated forest list requester 606 a list of one or more forests associated with the home forest of the mail-enabled object. As shown in FIG. 6, associated forest list requester 606 receives a forest list response signal 620 from the home forest of the mail-enabled object. Forest list response signal 620 indicates the one or more forest associated with the home forest of the mail-enabled object. Associated forest list requester 606 generates an associated forest list 624 that indicates the one or more forests associated with the home forest of the mail-enabled object.

In another embodiment, information regarding the one or more forests associated with the home forest of the mail-enabled object may be maintained locally to multi-forest manager 600 (e.g., stored in storage 602 shown in FIG. 6). In such an embodiment, associated forest list requester 606 may obtain the list of one or more forests associated with the home forest of the mail-enabled object locally (e.g., by accessing storage 602) rather than communicating with the home forest of the mail-enabled object.

In step 506, the mail-enabled object is included in a contact set associated with each forest of the plurality of forests. For example, in an embodiment, contact set modifier 608 may be configured to include an indication of the mail-enabled object in a contact set associated with each forest indicated by associated forest list 624. As shown in FIG. 6, storage 602 stores one or more contact sets 612, including first-third contact sets 612a-612c. Each contact set 612 corresponds to a particular forest, and indicates user accounts and groups that do not have the particular forest as their home forest. For example, contact set 612a may correspond to forest 102a shown in FIG. 1, and may list one or more user accounts and/or groups that have one of forests 102b-102n as their home forest.

As shown in FIG. 6, contact set modifier 608 receives associated forest list 622. Contact set modifier 608 may be configured to access a contact set 612 associated with each forest indicated in associated forest list 622. Contact set modifier 608 is configured to modify each accessed contact set 612 to indicate the mail-enabled object, and to store each modified contact set 612 back in storage 602. For example, contact set modifier 608 may provide identifying information (e.g., an identification number) for the user account or group, may indicate whether the mail-enabled object is a user account or group, may indicate the home forest for the mail-enabled object, and/or may provide further or alternative information in each accessed contact set 612 regarding the mail-enabled object. As shown in FIG. 6, contact set modifier 608 generates a contact object generate instruction 624.

In step 508, a contact object is generated for the mail-enabled object. For example, in an embodiment, contact object generator 610 may be configured to generate a contact object for the mail-enabled object. As shown in FIG. 6, contact object generator 610 receives contact object generate instruction 624. As a result, contact object generator 610 generates a contact object 626 for the mail enabled-object. For instance, as described above, contact object generator 610 may generate contact object 626 as a data structure that identifies itself as a contact object (e.g., includes an identifying code), indicates the particular user account or group (e.g., stores an identification number for the user account or group), and may include an indication for the home forest of the user account or group. In an embodiment, although not shown in FIG. 6, contact object 626 may be stored in storage 602.

In step 510, the contact object is included in a domain of each forest of the plurality of forests. For example, in an embodiment, contact object generator 610 may be configured to transmit contact object 626 to each forest listed in associated forest list 624. In an embodiment, the forest manager 408 of each forest listed in associated forest list 624 is configured to include contact object 626 in each domain of the forest. For example, each forest manager 408 may maintain a list or other data structure of contact objects for each domain of the managed forest. Contact object 626 may be added to the list or other data structure of contact objects for each domain.

Figure 7:
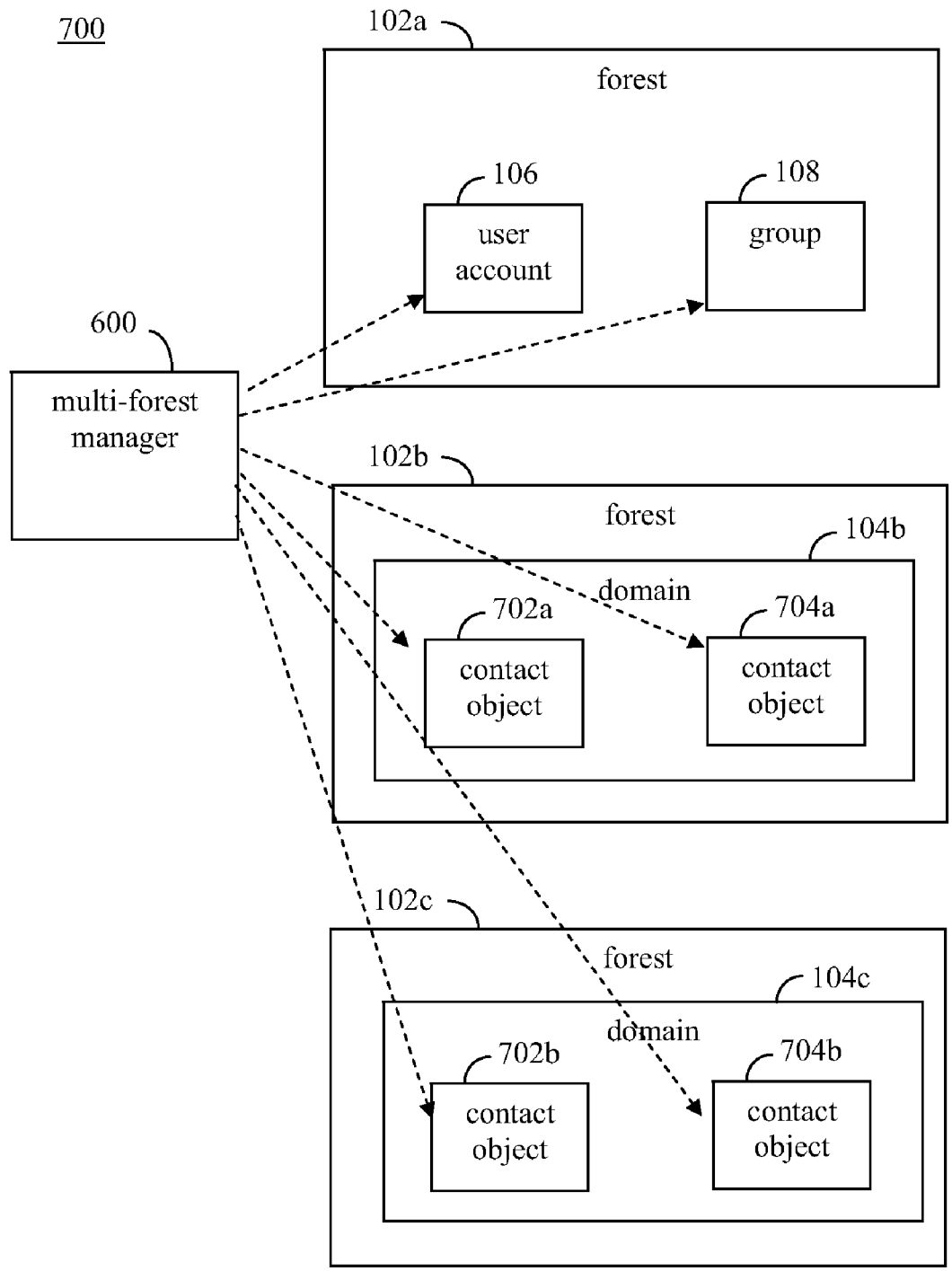
FIG. 7 shows a block diagram of a multi-forest management system, according to an example embodiment.

FIG. 7 shows a block diagram of a multi-forest management system 700, according to an example embodiment. FIG. 7 is provided to illustrate operation of multi-forest manager 600, in an example implementation. As shown in FIG. 7, system 700 includes multi-forest manager 600 and forests 102a-102c (forest managers 408a-408 corresponding to forests 102a-102c may also be present, but are not shown in FIG. 7 for ease of illustration). In a first example of FIG. 7, a user account 106 is mail-enabled (e.g., step 502 of flowchart 500 in FIG. 5). User account 106 is generated in forest 102a, which is the home forest for user account 106. Forests 102b and 102c are associated with forest 102a (and therefore may be determined in step 504). Multi-forest manager 600 may include an indication of user account 106 in contact sets 612b and 612c (FIG. 6) associated with forests 102b and 102c (e.g., step 506). Multi-forest manager 600 may generate a contact object 702 for user account 106 (step 508), and may include contact object 702 as contact object 702a in domain 104b of forest 102b and as contact object 702b in domain 104c of forest 102c (step 510).

Furthermore, in an analogous manner, a contact object 704 may be generated for a group 108 that is mail-enabled and has forest 102a as a home forest. As shown in FIG. 7, multi-forest manager 600 may generate contact object 704 for group 108, and may include contact object 704 as contact object 704a in domain 104b of forest 102b and as contact object 704b in domain 104c of forest 102c.

Multi-forest manager 600, associated forest list requester 606, contact set modifier 608, and contact object generator 610 may be implemented in hardware, software, firmware, or any combination thereof. For example, multi-forest manager 600, associated forest list requester 606, contact set modifier 608, and/or contact object generator 610 may be implemented as computer program code configured to be executed in one or more processors. Alternatively, multi-forest manager 600, associated forest list requester 606, contact set modifier 608, and/or contact object generator 610 may be implemented as hardware logic/electrical circuitry. Storage 602 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

B. Example Embodiments for Generating Security Proxies

Figure 8:
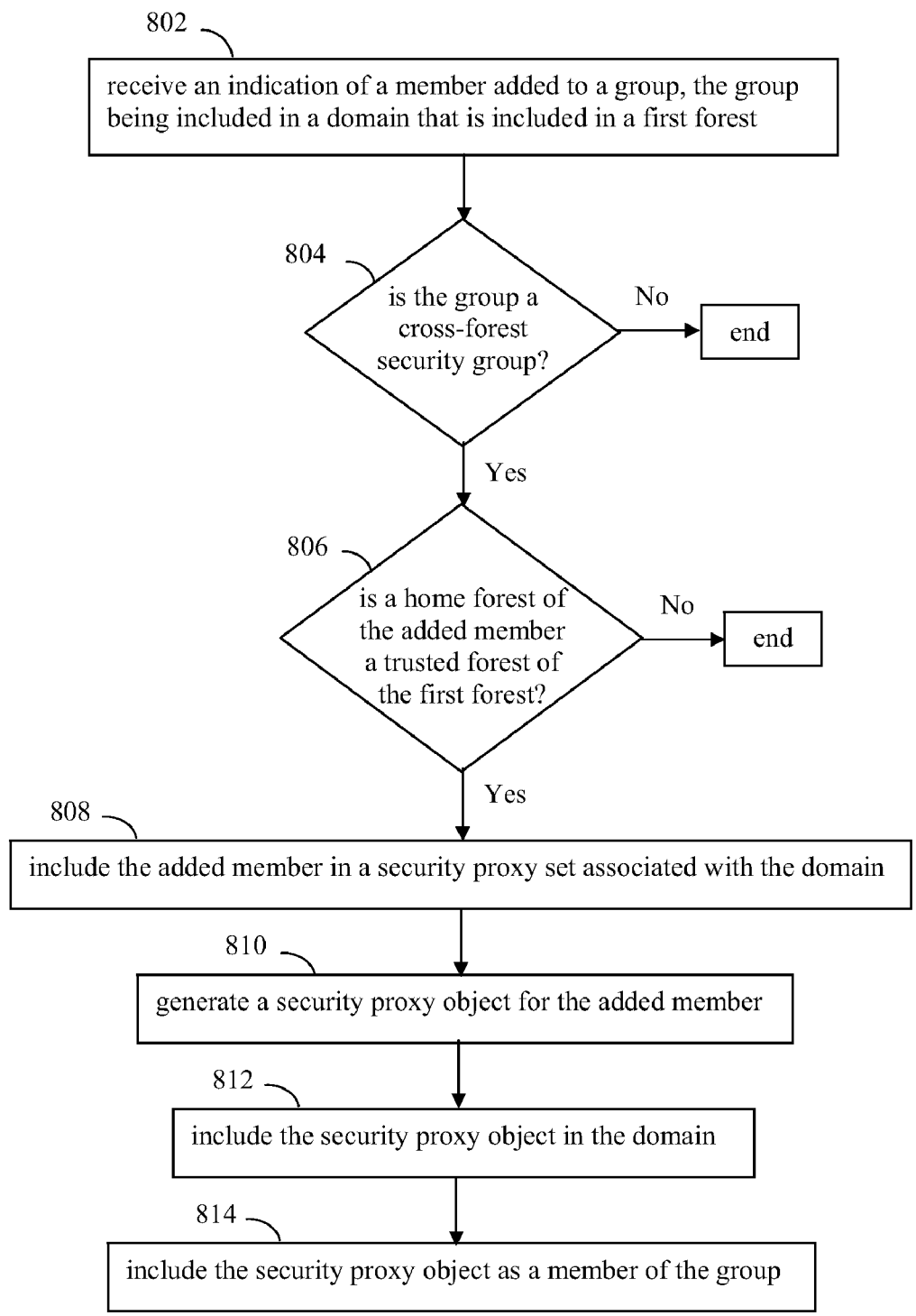
FIG. 8 shows a flowchart providing a process for generating security proxies for security principals and groups, according to an example embodiment.
Figure 9:
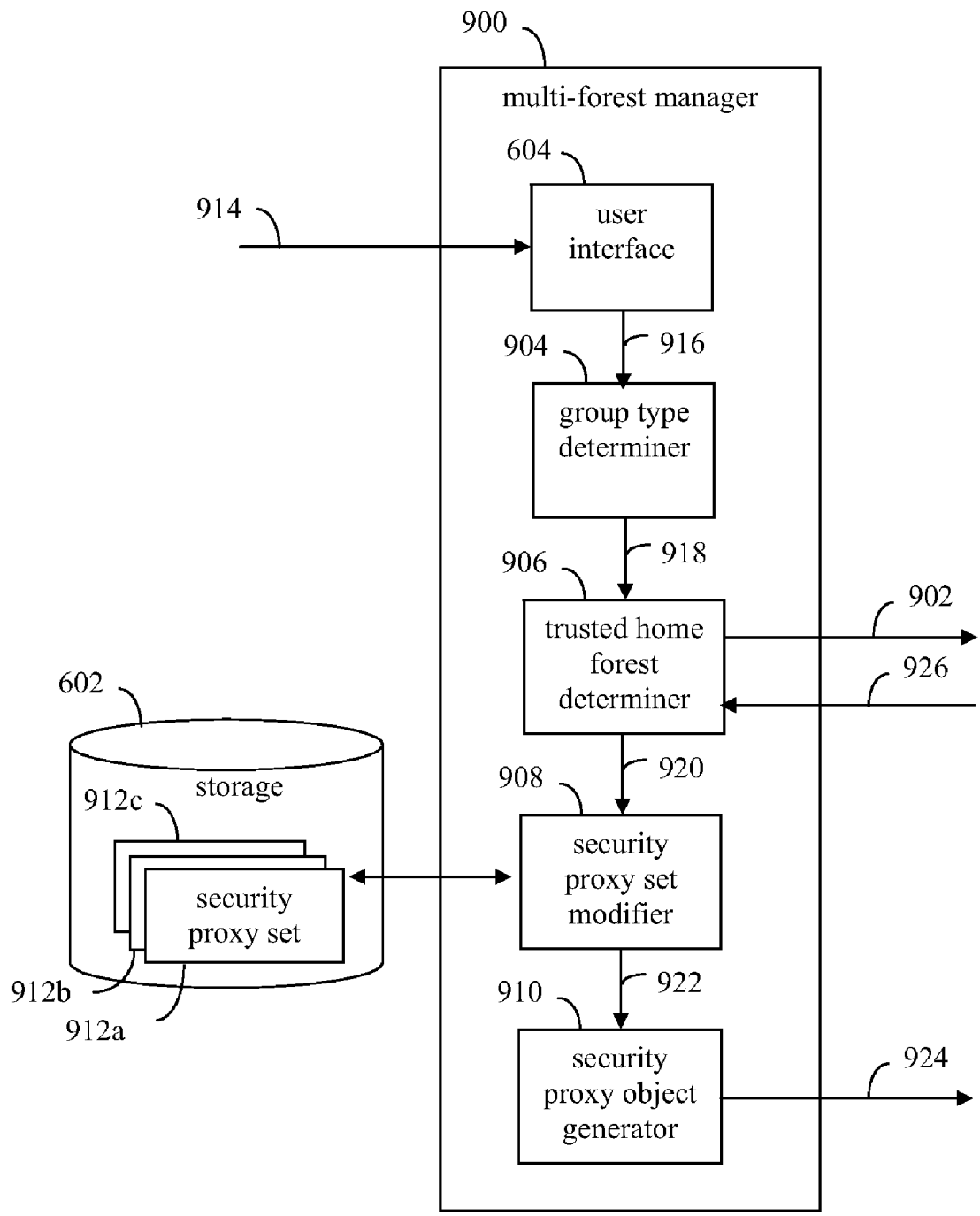
FIG. 9 shows a block diagram of a multi-forest manager, according to an example embodiment.

In embodiments, security proxies may be generated for security principals (e.g., objects that may be security-enabled, including user accounts, computer objects, etc.) and groups in various ways. For example, FIG. 8 shows a flowchart 800 providing a process for generating security proxies for security principals and groups, according to an example embodiment. In an embodiment, flowchart 800 may be performed by multi-forest manager 302 shown in FIGS. 3 and 4. Multi-forest manager 302 may be configured in various ways to generate security proxies for security principals and groups. For instance, FIG. 9 shows a block diagram of a multi-forest manager 900, according to an example embodiment. Multi-forest manager 900 is an example of multi-forest manager 302. As shown in FIG. 9, multi-forest manager 600 includes user interface 604, group type determiner 904, trusted home forest determiner 906, security proxy set modifier 908, and a security proxy object generator 910. Flowchart 800 is described as follows with respect to multi-forest manager 900 for illustrative purposes. The steps of flowchart 800 do not necessarily need to be performed in the order shown. Other structural and operational embodiments will be apparent to persons skilled in the relevant art(s) based on the discussion regarding flowchart 800 and multi-forest manager 900.

As shown in FIG. 8, flowchart 800 begins with step 802. In step 802, an indication of a member added to a group is received, the group being included in a domain that is included in a first forest. For example, as shown in FIG. 9, an added member indication 914 may be received by user interface 604. User interface 604 is an interface for users to interact with multi-forest manager 900. A user (e.g., an IT administrator or other person) may interact with user interface 604 to add a member (a security principal or group) to a group of a forest (the group being included in a domain of the forest) managed by multi-forest manager 900. The user may input information identifying the added member into user interface 604, including the identification of a home forest (e.g., one of forests 102a-102n in FIG. 1) of the added member and the group (e.g., one of groups 108a-108p). As shown in FIG. 9, user interface 604 generates added member information 916. Added member information 616 identifies the added member (e.g., security principal or group), the group into which the member is added, a home forest of the added member, and optionally further information.

As described above, user interface 604 is optional. In another embodiment, where user interface 604 is not present, added member indication 914 may be received at group type determiner 904. For example, added member indication 914 may be transmitted from a forest (e.g., from a forest manager 408 in FIG. 4 of a forest 102) where the member was added.

In step 804, whether the group is a cross-forest security group is determined. For example, in an embodiment, group type determiner 904 may be configured to determine whether the group to which the member was added is a cross-forest security group. A security group is a type of group that enables members of the group to access resources associated with the group ("resources secured by the group") (e.g., access to particular records, computers, etc.). Access to resources associated with a security group is limited to members of the security group. A cross-forest security group is a security group that is configured to enable access to resources to members that are from multiple designated forests.

As shown in FIG. 9, group type determiner 904 receives added member information 916. Group type determiner 904 determines whether the group indicated in added member information 916 (to which the member was added) is a cross-forest security group. For example, if group type determiner 904 determines the group to not be a security group, such as being a mail-enabled group that is not a security group, group type determiner 904 determines the group to not be a cross-forest security group. Furthermore, if group type determiner 904 determines that the group is not a cross-forest group, group type determiner 904 determines the group to not be a cross-forest security group. In either of such cases, as shown in flowchart 800 in FIG. 8, processing in flowchart 800 ends. If group type determiner 904 determines the group to be a security group (mail-enabled or not mail-enabled) and determines the group to be a cross-forest group, processing in flowchart 800 proceeds from step 804 to step 806. As shown in FIG. 9, group type determiner 904 generates a cross-forest security group verification indication 918, which indicates whether the group to which the member was added was determined to be a cross-forest security group.

In an embodiment, although not shown in FIG. 9, storage 902 may store a list or other data structure of groups that are cross-forest groups. For example, the data structure may identify groups and the forests in which the groups are included (e.g., may identify groups in which a security proxy object for the group is included). Group type determiner 904 may access this data structure in storage 902 to determine whether the group indicated for the added member is a cross-forest security group. In another embodiment, group type determiner 904 may communicate with one or more forest managers 408 at one or more forests 102 to determine whether the group indicated for the added member is a cross-forest security group.

Note that groups may be classified in various ways to indicate whether they are cross-forest groups. For example, in one embodiment, groups may be classified as cross-forest or not cross-forest. In another embodiment, groups may be classified as "domain local," "global," or "universal." Domain local groups are cross-forest groups that can include members from anywhere in the home forest of the group and from domains in other trusted forests. Global groups can include members from within their own domain. Universal groups can include members from any domain of their home forest. In such an embodiment, if a group has a classification/scope of "domain local," the group is considered to be cross-forest. Further classifications for groups may additionally or alternatively be present, in embodiments.

In step 806, whether a home forest of the added member is a trusted forest of the first forest is determined. For example, in an embodiment, trusted home forest determiner 906 may be configured to determine whether a home forest of the added member is a trusted forest of the forest of the group to which the member was added. A trusted forest of a first forest is a forest that allows members of security groups of the first forest to access resources in the trusted forest that are secured by the security group. For example, referring to FIG. 1, second forest 102b may be a trusted forest of first forest 102a. As such, members of cross-forest security groups having first forest 102a as a home forest may be enabled to access resources of second forest 102b that are secured by the security group.

As shown in FIG. 9, trusted home forest determiner 906 receives cross-forest security group verification indication 918. If the group to which the member was added is a cross-forest security group, cross-forest security group verification indication 918 enables trusted home forest determiner 906 to operate. When enabled, trusted home forest determiner 906 determines whether a home forest of the added member is a trusted forest of the first forest. In an embodiment, as shown in FIG. 9, trusted home forest determiner 906 may transmit a trusted forest request signal 902 to the forest (e.g., to the forest manager 408 shown in FIG. 4 of the first forest, through network 404), referred to as the "first forest" for ease of illustration, having the group in which the member was added. Trusted forest request signal 902 is a request for a list of one or more forests trusted by the first forest. As shown in FIG. 9, trusted home forest determiner 906 receives a trusted forest response signal 926 from the first forest. Trusted forest response signal 926 indicates trusted forests of the first forest. Trusted home forest determiner 906 determines whether the home forest of the added member, which is indicated in added member information 916, is included in the received list of trusted forests of the first forest. As shown in FIG. 9, trusted home forest determiner 906 generates a trusted forest indication 920, which indicates whether the home forest of the added member is a trusted forest of the first forest.

In another embodiment, information regarding trusted forests of the first forest (and further forests) may be maintained locally to multi-forest manager 900 (e.g., stored in storage 602 shown in FIG. 6). In such an embodiment, trusted home forest determiner 906 may obtain the list of trusted forests locally (e.g., by accessing storage 602) rather than by communicating with the first forest.

As shown in FIG. 8, in step 806, if the home forest of the added member is a trusted forest of the first forest, processing flows to step 808. If the home forest of the added member is not a trusted forest of the first forest, processing in flowchart 800 ends. Referring to FIG. 9, in an alternative embodiment, instead of ending processing, multi-forest manager 900 may include logic (e.g., computer program code, electrical circuits, etc.) to determine whether the home forest of the added member is the same as the first forest. If the home forest of the added member is the first forest, the added member is included in the group rather than including a security proxy object in the group. In an embodiment, the determination of whether the home forest of the added member is the same as the first forest may be performed prior to step 806 and/or prior to step 804.

In step 808, the added member is included in a security proxy set associated with the domain. For example, in an embodiment, security proxy set modifier 908 may be configured to include an indication of the added member in a security proxy set associated with the domain in which the group is included (e.g., the home domain of the group). As shown in FIG. 9, storage 602 stores one or more security proxy sets 912, including first-third security proxy sets 912a-912c. Each security proxy set 912 corresponds to a particular domain of the forests managed by multi-forest manager 900, and indicates group members included in the domain that do not have the forest in which the domain resides as their home forest. For example, security proxy set 912a may correspond to domain 104a of forest 102a shown in FIG. 1, and may list one or more group members (security principals or groups) that have one of forests 102b-102n as their home forest.

As shown in FIG. 9, security proxy set modifier 908 receives trusted forest indication 920. If trusted forest indication 920 indicates that the home forest of the added member is a trusted forest of the first forest, security proxy set modifier 908 accesses a security proxy set 912 associated with the domain of the forest in which the group was included. Security proxy set modifier 908 is configured to modify the security proxy set 912 to indicate the added member, and to store the modified security proxy set 912 back in storage 602. For example, security proxy set modifier 908 may provide identifying information (e.g., an identification number) for the member, may indicate whether the member is a security principal or group, may indicate the home forest for the member, and/or may provide further or alternative information in the security proxy set 912 regarding the member. As shown in FIG. 9, security proxy set modifier 908 generates a security proxy object generate instruction 922.

In step 810, a security proxy object is generated for the added member. For example, in an embodiment, security proxy object generator 910 may be configured to generate a security proxy object for the added member. As shown in FIG. 9, security proxy object generator 910 receives security proxy object generate instruction 922. As a result, security proxy object generator 910 generates a security proxy object 924 for the added member. For instance, as described above, security proxy object generator 910 may generate security proxy object 924 as a data structure that identifies itself as a security proxy object (e.g., includes an identifying code), indicates the particular member (e.g., stores an identification number for the security principal or group), and may include an indication for the home forest of the member. In an embodiment, although not shown in FIG. 9, security proxy object 924 may be stored in storage 602.

In step 812, the security proxy object is included in the domain. For example, in an embodiment, security proxy object generator 910 may be configured to transmit security proxy object 924 to the forest that includes the domain in which the member was added to a group. In an embodiment, a forest manager 408 of the forest that receives security proxy object 924 may be configured to include security proxy object 924 in the domain. For example, forest manager 408 may maintain a list or other data structure of security proxy objects for each domain of the managed forest. Security proxy object 924 may be added to the list or other data structure of security proxy objects for the appropriate domain. In another embodiment, a group membership may be transmitted to the forest that includes the domain. The group membership may include all members of the group to which the member was added, including the added member, or may just indicate new members of the group. The group membership may be transmitted as a request to generate a security proxy object at the forest for the added member. The generated security proxy object may then be included in the domain.

In step 814, the security proxy object is included as a member of the group. In an embodiment, the forest manager 408 of the forest that receives security proxy object 924 and that includes the domain having the group to which the member was added may be configured to include security proxy object 924 as a member of the group. For example, forest manager 408 may maintain a list or other data structure of security proxy objects for each group of the managed forest. Security proxy object 924 may be added to the list or other data structure of security proxy objects for the appropriate group. Alternatively, multi-forest manager 900 may be configured to include security proxy object 924 as a member of the group. For example, storage 602 may maintain the list or other data structure of security proxy objects for each group of the managed forest(s). Security proxy object 924 may be added to the list or other data structure in storage 602 by security proxy object generator 910.

Figure 10:
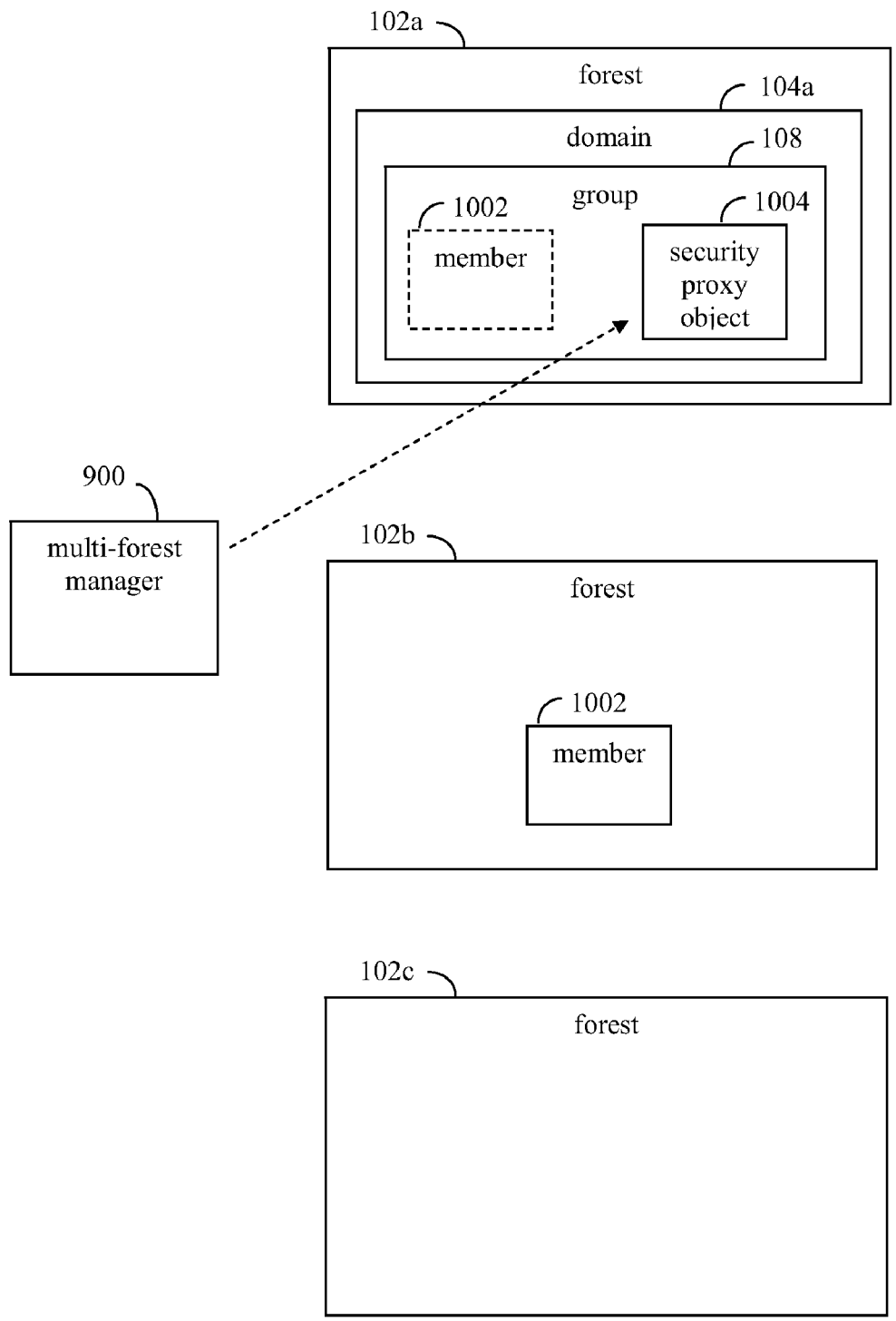
FIG. 10 shows a block diagram of a multi-forest management system, according to an example embodiment.

FIG. 10 shows a block diagram of a multi-forest management system 1000, according to an example embodiment. FIG. 10 is provided to illustrate operation of multi-forest manager 900, in an example implementation. As shown in FIG. 10, system 1000 includes multi-forest manager 900 and forests 102a-102c (forest managers 408a-408 corresponding to forests 102a-102c may also be present, but are not shown in FIG. 10 for ease of illustration). In FIG. 10, forest 102b is a trusted forest of forest 102a, and forest 102c is not a trusted forest of forest 102a. A member 1002 (security principal or group) is added to a group 108 (e.g., step 802 of FIG. 8) of domain 104a of forest 102a. The home forest of member 1002 is forest 102b (if the home forest of member 1002 was forest 102a, member 1002 may be added to group 108, ending processing). Group 108 is evaluated by multi-forest manager 900 to determine whether group 108 is a cross-forest security group (step 804). If group 108 is not a cross-forest security group, processing ends. If group 108 is a cross-forest security group, the home forest of member 1002 is evaluated by multi-forest manager 900 to determine whether it is a trusted forest of forest 102a (step 806). In the current example, forest 102b (the home forest of member 1002) is trusted by forest 102a (if the home forest of member 1002 was forest 102c, which is not trusted by forest 102a, processing may end). As such, multi-forest manager 900 may include an indication of member 1002 in security proxy set 912a associated with domain 104a (e.g., step 808). Multi-forest manager 900 may generate a security proxy object 1004 for member 1002 (step 810), and may include security proxy object 1004 in group 108 of domain 104a in forest 102a (steps 812 and 814).

Multi-forest manager 900, group type determiner 904, trusted home forest determiner 906, security proxy set modifier 908, and security proxy object generator 910 may be implemented in hardware, software, firmware, or any combination thereof. For example, multi-forest manager 900, group type determiner 904, trusted home forest determiner 906, security proxy set modifier 908, and/or security proxy object generator 910 may be implemented as computer program code configured to be executed in one or more processors. Alternatively, multi-forest manager 900, group type determiner 904, trusted home forest determiner 906, security proxy set modifier 908, and/or security proxy object generator 910 may be implemented as hardware logic/electrical circuitry.

C. Example Embodiments for Selecting Contacts or Security Proxies

Figure 11:
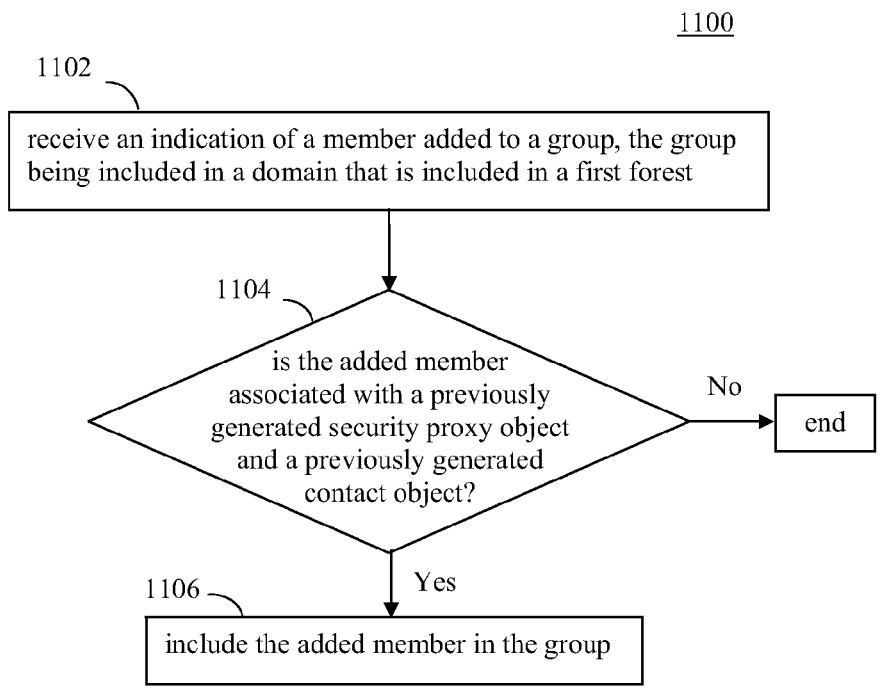
FIGS. 11 and 12 show flowcharts providing processes for selecting a contact proxy or a security proxy for membership in a group, according to example embodiments.
Figure 12:
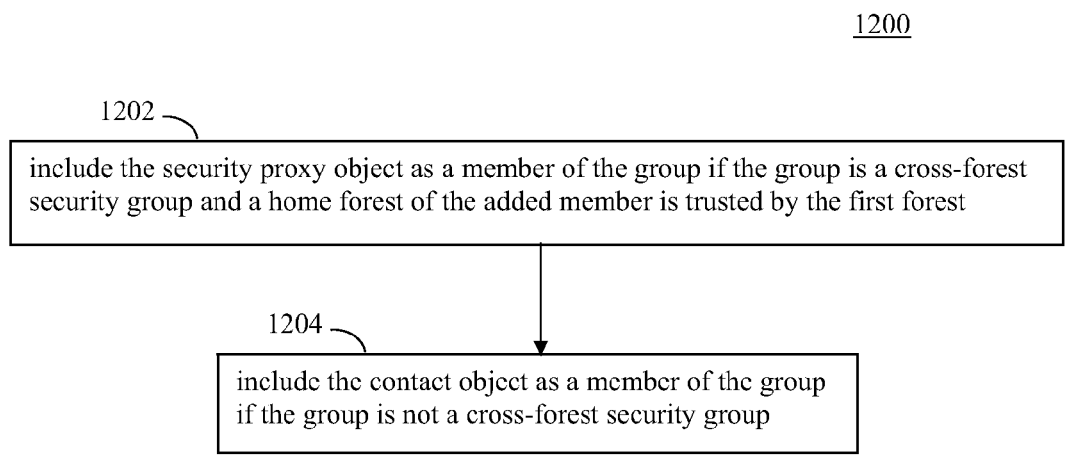
Figure 13:
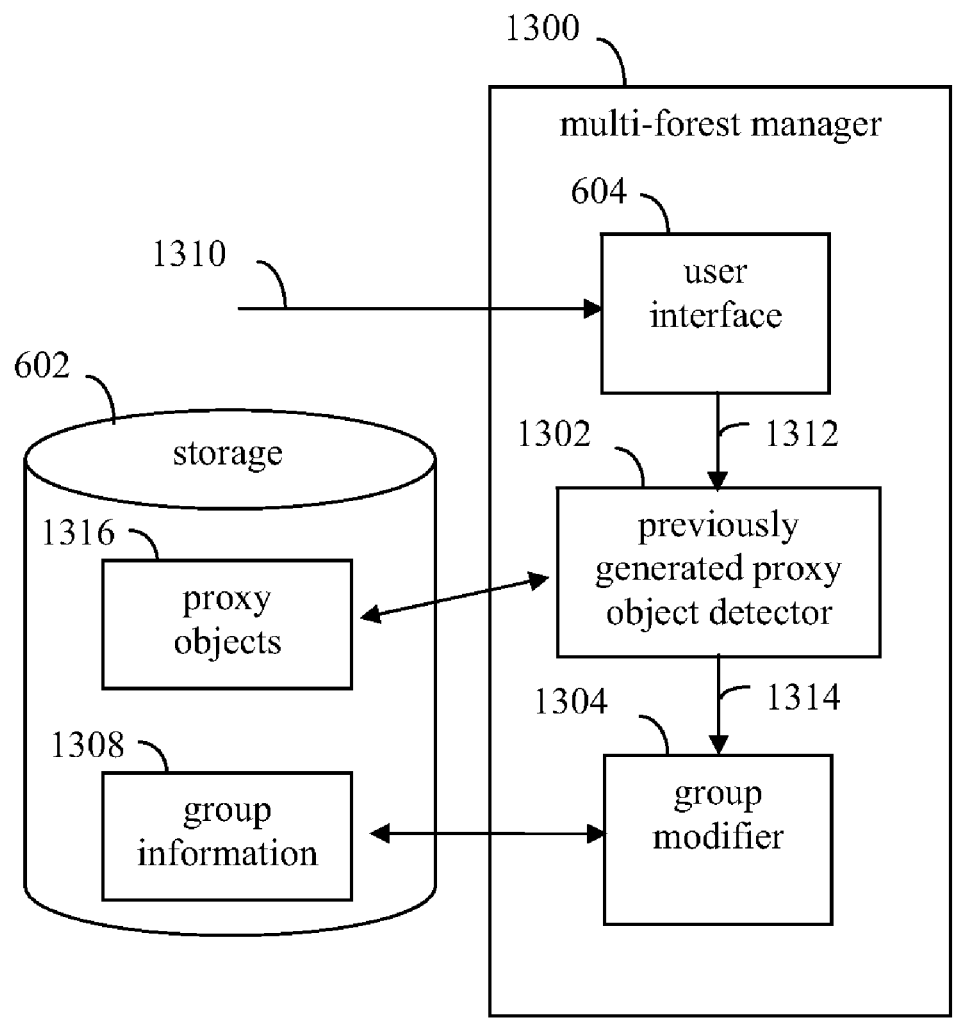
FIG. 13 shows a block diagram of a multi-forest manager, according to an example embodiment.

As described above, contact proxies and security proxies may be generated for user accounts, security principals, and groups in various ways. In some situations, both a contact proxy and a security proxy may be generated for a group member. In such case, it may be desirable to select one of the contact proxy or security proxy, so that a single representative for the group member is present in the group. Such selection of a proxy may be performed in various ways. For example, FIGS. 11 and 12 show flowcharts 1100 and 1200 providing processes for selecting a contact proxy or a security proxy for membership in a group, according to example embodiments. In an embodiment, flowcharts 1100 and 1200 may be performed by multi-forest manager 302 shown in FIGS. 3 and 4. Multi-forest manager 302 may be configured in various ways to select a proxy for a group. For instance, FIG. 13 shows a block diagram of a multi-forest manager 1300, according to an example embodiment. Multi-forest manager 1300 is an example of multi-forest manager 302. As shown in FIG. 13, multi-forest manager 1300 includes user interface 604, a previously generated proxy object detector 1302, and a group modifier 1304. Flowcharts 1100 and 1200 are described as follows with respect to multi-forest manager 1300 for illustrative purposes. The steps of flowchart 1100 and 1200 do not necessarily need to be performed in the orders shown. Other structural and operational embodiments will be apparent to persons skilled in the relevant art(s) based on the discussion regarding flowcharts 1100 and 1200, and multi-forest manager 1300.

As shown in FIG. 11, flowchart 1100 begins with step 1102. In step 1102, an indication is received of a member added to a group, the group being included in a domain that is included in a first forest. For example, as shown in FIG. 13, an added member indication 1310 may be received by user interface 604. User interface 604 is an interface for users to interact with multi-forest manager 1300. A user (e.g., an IT administrator or other person) may interact with user interface 604 to add a member (a security principal or group) to a group of a forest (the group being included in a domain of the forest) managed by multi-forest manager 1300. The user may input information identifying the added member into user interface 604, including the identification of a home forest (e.g., one of forests 102a-102n in FIG. 1) of the added member. As shown in FIG. 13, user interface 604 generates added member information 1312. Added member information 1312 identifies the added member (e.g., security principal or group), the group into which the member is added, a home forest of the added member, and/or optionally further information.

As described above, user interface 604 is optional. In another embodiment, where user interface 604 is not present, added member indication 1310 may be received at previously generated object detector 1302. For example, added member indication 1310 may be transmitted from a forest (e.g., from a forest manager 408 in FIG. 4 of a forest 102) where the member was added.

In step 1104, whether the added member is associated with a previously generated security proxy object and a previously generated contact object is determined. For example, in an embodiment, previously generated proxy object detector 1302 may determine whether a security proxy object and a contact object were previously generated for the added member. For example, in an embodiment, previously generated proxy object detector 1302 may be configured to access storage 602 for proxy objects 1316. Proxy objects 1316 is a data structure that includes any contact objects (e.g., contact objects 626 of FIG. 6) and security proxy objects (e.g., security proxy objects 924 of FIG. 9) that have previously been generated. For example, contact objects may be included in proxy objects 1316 that were previously generated according to flowchart 500 (FIG. 5) or in another manner. Security proxy objects may be included in proxy objects 1316 that were previously generated according to flowchart 800 (FIG. 8) or in another manner.

Previously generated proxy object detector 1302 may be configured to determine whether a contact object or security proxy object for the added member is included in proxy objects 1316. For example, previously generated proxy object detector 1302 may compare identifying information (e.g., an identification number) for the added member to identifying information for proxy objects in proxy objects 1316. If one or neither of a contact object or security proxy object corresponding to the added member is determined to be present in proxy objects 1316, processing according to flowchart 1100 ends. If both of a contact object and a security proxy object corresponding to the added member are determined to be present in proxy objects 1316, processing according to flowchart 1100 proceeds to step 1106. As shown in FIG. 13, previously generated proxy object detector 1302 generates a previously generated proxy object indication signal 1314, which indicates whether a contact object and security proxy object have been previously generated for the added member.

It is noted that in alternative embodiments, previously generated proxy object detector 1302 may determine information regarding previously generated proxy objects from one or more sources other than storage 602. For example, in an embodiment, previously generated proxy object detector 1302 may communicate (e.g., through network 404 of FIG. 4) with one or more of forests 102a-102n (e.g., by communicating with forest managers 408 of FIG. 4) to retrieve information on previously generated contact objects and security proxy objects associated with forests 102a-102n.

In step 1106, the added member is included in the group. For example, in an embodiment, group modifier 1304 may be configured to include the added member in the group. As shown in FIG. 13, group modifier 1304 receives previously generated proxy object indication signal 1314. In an embodiment, if previously generated proxy object indication signal 1314, indicates that a contact object and security proxy object have been previously generated for the added member, group modifier 1304 is configured to include the added member in the group. In an embodiment, group modifier 1304 is configured to select either the previously generated contact object or the security proxy object for inclusion in the group. As shown in the example of FIG. 13, storage 602 may store group information 1308. For example, group information 1308 may indicate groups that are present in the forests managed by multi-forest manager 1300, and may indicate members for each group. In an embodiment, group modifier 1304 may select one of the previously generated contact object or the previously generated security proxy object, and may include the selected object in group information 1308 for the group.

In another embodiment, group information for groups may be maintained local to each forest 102 (e.g., may be maintained by the corresponding forest manager 408). In such an embodiment, group modifier 1304 may transmit the selected previously generated contact object or previously generated security proxy object to the forest 102 that includes the group so that the forest 102 (e.g., the forest manager 408) may include the selected object in group information for the group.

Group modifier 1304 may select between including the previously generated contact object or the previously generated security proxy object for inclusion in the group in various ways. For example, step 1106 may be performed according to flowchart 1200 in FIG. 12. Flowchart 1200 begins with step 1202. In step 1202, the security proxy object is included as a member of the group if the group is a cross-forest security group and a home forest of the added member is trusted by the first forest. For example, in an embodiment, group modifier 1304 may be configured to determine whether the group is a cross-forest security group in a similar manner as described above with respect to step 804 shown in FIG. 8 (e.g., as performed by group type determiner 904 in FIG. 9). Furthermore, group modifier 1304 may be configured to determine whether the home forest of the added member is trusted by the first forest in a similar manner as described above with respect to step 806 of FIG. 8 (e.g., as performed by trusted forest home determiner 906 of FIG. 9). If group modifier 1304 determines that the group is a cross-forest security group and that the home forest of the added member is trusted by the first forest, the security proxy object is selected to be included as a member in the group.

In step 1204, the contact object is included as a member of the group if the group is not a cross-forest security group. For example, if group modifier 1304 determines that the group is not a cross-forest security group (e.g., regardless of whether the home forest of the added member is trusted by the first forest), the contact object is selected to be included as a member in the group.

In an embodiment, if the group is determined to be a cross-forest security group but the home forest of the added member is determined to not be trusted by the first forest, group modifier 1304 includes neither of the previously generated contact object and previously generated security proxy object as a member in the group.

Figure 14:
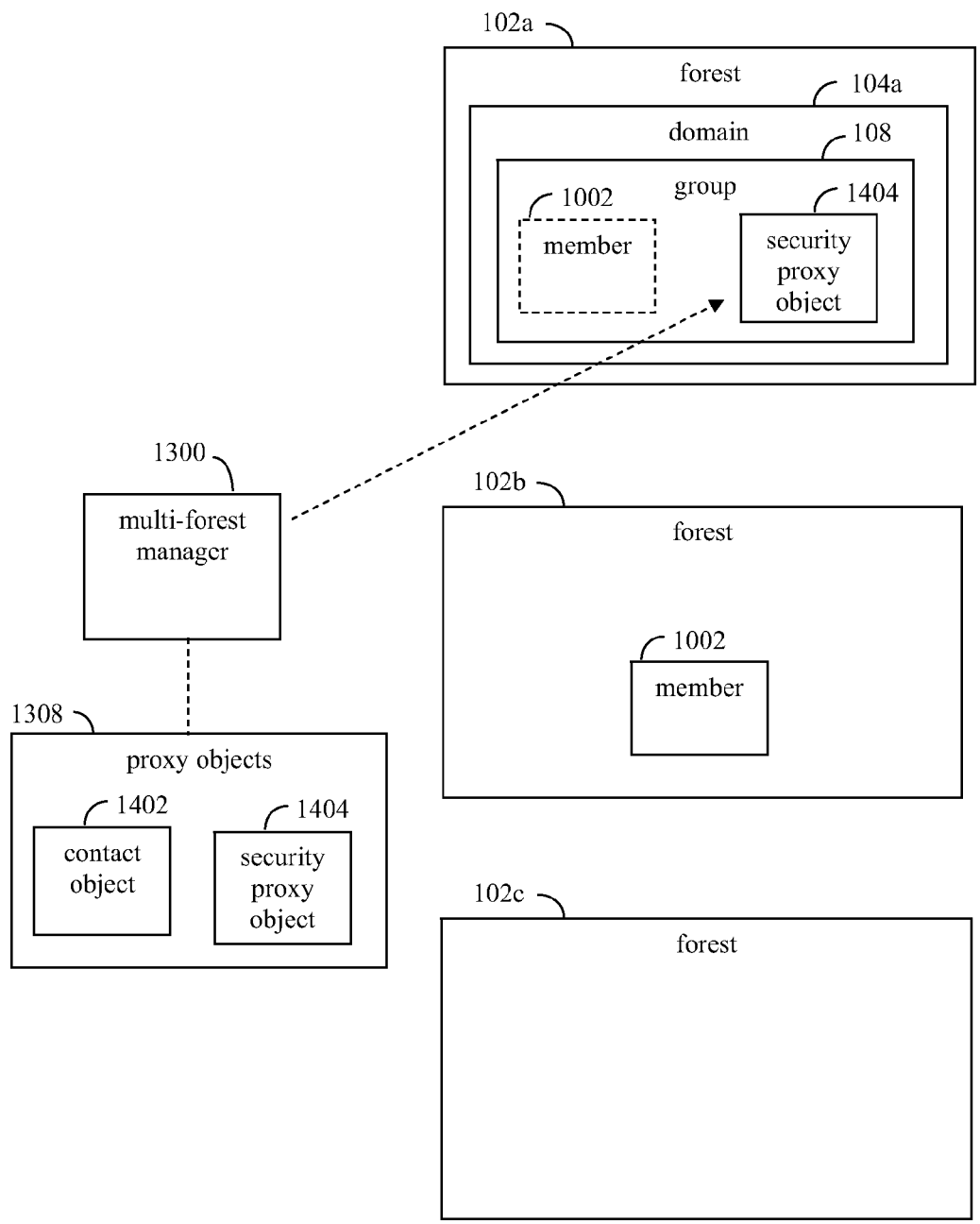
FIG. 14 shows a block diagram of a multi-forest management system, according to an example embodiment.

FIG. 14 shows a block diagram of a multi-forest management system 1400, according to an example embodiment. FIG. 14 is provided to illustrate operation of multi-forest manager 1300, in an example implementation. As shown in FIG. 14, system 1400 includes multi-forest manager 1400 and forests 102a-102c (forest managers 408a-408 corresponding to forests 102a-102c may also be present, but are not shown in FIG. 14 for ease of illustration). In FIG. 14, forest 102b is a trusted forest of forest 102a, and forest 102c is not a trusted forest of forest 102a. Member 1002 is added to group 108 (e.g., step 1102 of FIG. 1) of forest 102a. The home forest of member 1002 is forest 102b. Multi-forest manager 1300 determines that a previously generated contact object, contact object 1402, and a previously generated security proxy object, security proxy object 1404, exist for member 1002 (e.g., step 1104, by accessing proxy objects 1308). As such, multi-forest manager 1300 may be configured to include member 1002 in group 108 (step 1106).

Group 108 is evaluated by multi-forest manager 900 to determine whether group 108 is a cross-forest security group and whether the home forest of member 1002 is a trusted forest of forest 102a. If group 108 is a cross-forest security group and the home forest of member 1002 is a trusted forest of forest 102a, security proxy object 1404 is included in group 108 (e.g., step 1202 of FIG. 12). In the current example, group 108 is a cross-forest security group and home forest 102b of member 1002 is a trusted forest of forest 102, so security proxy object 1404 is included in group 108, as shown in FIG. 14. If group 108 was not a cross-forest security group, contact object 1402 would instead be included in group 108 (step 1204).

Multi-forest manager 1300, previously generated proxy object detector 1302, and group modifier 1304 may be implemented in hardware, software, firmware, or any combination thereof. For example, multi-forest manager 1300, previously generated proxy object detector 1302, and/or group modifier 1304 may be implemented as computer program code configured to be executed in one or more processors. Alternatively, multi-forest manager 1300, previously generated proxy object detector 1302, and/or group modifier 1304 may be implemented as hardware logic/electrical circuitry.

III Further Example Embodiments

Figure 15:
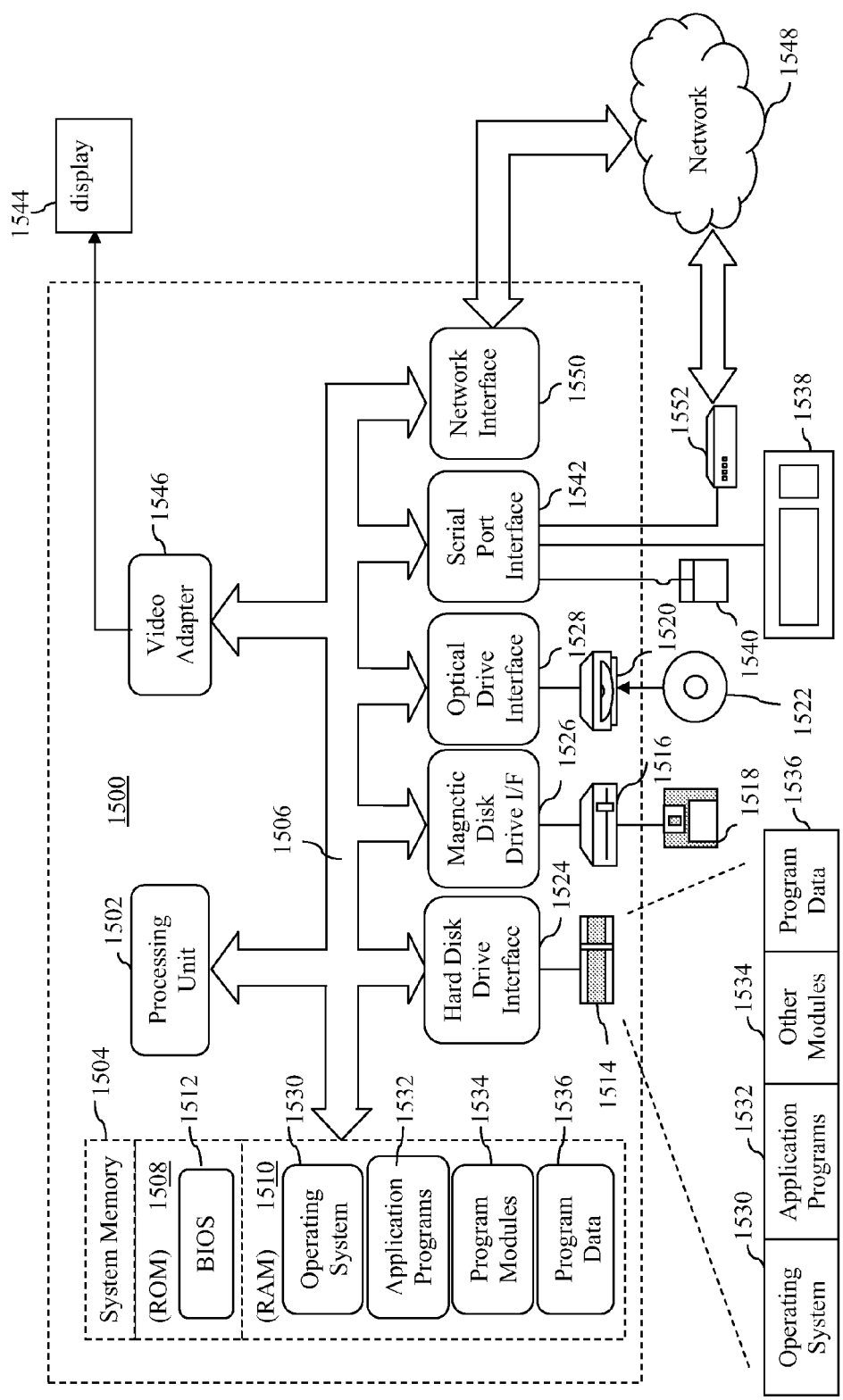
FIG. 15 shows a block diagram of an example computer that may be used to implement embodiments of the present invention.

FIG. 15 depicts an exemplary implementation of a computer 1500 in which embodiments of the present invention may be implemented. For instance, computer system 402 and computer systems 406a-406c shown in FIG. 4 may be implemented similarly to computer 1500, and may include one or more features of computer 1500 and/or alternative features. Computer 1500 may be a general-purpose computing device in the form of a conventional personal computer, a mobile computer, or a workstation, for example, or computer 1500 may be a special purpose computing device. The description of computer 1500 provided herein is provided for purposes of illustration, and is not intended to be limiting. Embodiments of the present invention may be implemented in further types of computer systems, as would be known to persons skilled in the relevant art(s).

As shown in FIG. 15, computer 1500 includes a processing unit 1502, a system memory 1504, and a bus 1506 that couples various system components including system memory 1504 to processing unit 1502. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computer 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1530, one or more application programs 1532, other program modules 1534, and program data 1536. Application programs 1532 or program modules 1534 may include, for example, computer program logic for implementing multi-forest manager 600, associated forest list requester 606, contact set modifier 608, contact object generator 610, multi-forest manager 900, group type determiner 904, trusted home forest determiner 906, security proxy set modifier 908, security proxy object generator 910, multi-forest manager 1300, previously generated proxy object detector 1302, and/or group modifier 1304, flowcharts 500, 800, 1100, and/or 1200 (including any step of flowcharts 500, 800, 1100, and/or 1200), and/or any further embodiments as described above.

A user may enter commands and information into the computer 1500 through input devices such as keyboard 1538 and pointing device 1540. Other input devices (not shown) may include a microphone, joystick, game pad, satellite dish, scanner, or the like. These and other input devices are often connected to the processing unit 1502 through a serial port interface 1542 that is coupled to bus 1506, but may be connected by other interfaces, such as a parallel port, game port, or a universal serial bus (USB).

A monitor 1544 or other type of display device is also connected to bus 1506 via an interface, such as a video adapter 1546. In addition to the monitor, computer 1500 may include other peripheral output devices (not shown) such as speakers and printers.

Computer 1500 is connected to a network 1548 (e.g., the Internet) through a network interface or adapter 1550, a modem 1552, or other means for establishing communications over the network. Modem 1552, which may be internal or external, is connected to bus 1506 via serial port interface 1542.

As used herein, the terms "computer program medium" and "computer-readable medium" are used to generally refer to media such as the hard disk associated with hard disk drive 1514, removable magnetic disk 1518, removable optical disk 1522, as well as other media such as flash memory cards, digital video disks, random access memories (RAMs), read only memories (ROM), and the like.

As noted above, computer programs and modules (including application programs 1532 and other program modules 1534) may be stored on the hard disk, magnetic disk, optical disk, ROM, or RAM. Such computer programs may also be received via network interface 1550 or serial port interface 1542. Such computer programs, when executed or loaded by an application, enable computer 1500 to implement features of embodiments of the present invention discussed herein. Accordingly, such computer programs represent controllers of the computer 1500.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method, comprising:
   receiving an indication of a member added to a group, the group being included in a domain that is included in a first forest;
   determining whether the group is a cross-forest security group;
   determining whether a home forest of the added member is a forest that is trusted by the first forest;
   including the added member in a security proxy set associated with the domain if the group is determined to be a cross-forest security group and the home forest of the added member is determined to be a trusted forest of the first forest;
   generating a security proxy object for the added member; and
   including the security proxy object in the domain.

2. The method of claim 1, further comprising:
   including the security proxy object as a member of the group.

3. The method of claim 1, further comprising:
 determining whether the home forest of the added member is the first forest; and
 including the added member in the group if the home forest of the added member is determined to be the first forest.

4. The method of claim 1, wherein the member is a group or a security principal.

5. The method of claim 1, wherein said determining that the group is a cross-forest security group comprises:
 determining that the group is a mail-enabled cross-forest security group.

6. The method of claim 1, wherein said determining whether a home forest of the added member is a forest that is trusted by the first forest comprises:
 transmitting a request to the first forest for an indication of one or more forests trusted by the first forest.

7. The method of claim 1, wherein said including the security proxy object in the domain comprises:
 transmitting to the first forest a group membership that includes the added member to request a security proxy object be generated and added to the domain.

8. A computer implemented method, comprising:
 receiving an indication of a member added to a group, the group being included in a domain that is included in a first forest;
 determining that the added member is associated with a previously generated security proxy object and a previously generated contact object;
 determining whether the group is a cross-forest security group;
 determining whether a home forest of the added member is a forest that is trusted by the first forest; and
 including the security proxy object as a member of the group if the group is determined to be a cross-forest security group and the home forest of the added member is determined to be trusted by the first forest.

9. The method of claim 8, further comprising:
 including the contact object as a member of the group if the group is determined to not be a cross-forest security group.

10. The method of claim 8, further comprising:
 determining that the member is not to be included as a member of the group if the group is determined to be a cross-forest security group and the home forest of the added member is determined to not be trusted by the first forest.

11. The method of claim 8, wherein the member is a group or a security principal.

12. The method of claim 8, wherein said determining whether a home forest of the added member is a forest that is trusted by the first forest comprises:
 transmitting a request to the first forest for an indication of one or more forests trusted by the first forest.

13. The method of claim 8, wherein said including the security proxy object as a member of the group if the group is determined to be a cross-forest security group and the home forest of the added member is determined to be trusted by the first forest comprises:
 transmitting to the first forest a group membership that includes the added member to request a security proxy object be generated and added to the domain.

14. The method of claim 9, wherein said including the contact object as a member of the group if the group is determined to not be a cross-forest security group comprises:
 transmitting the contact object to the first forest.

\* \* \* \* \*